United States Patent
Tourapis

(10) Patent No.: US 10,708,588 B2
(45) Date of Patent: Jul. 7, 2020

(54) SAMPLE ADAPTIVE OFFSET CONTROL

(71) Applicant: Apple Inc., Cupertino, CA (US)

(72) Inventor: Alexandros Tourapis, Milpitas, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/255,609

(22) Filed: Apr. 17, 2014

(65) Prior Publication Data

US 2014/0376608 A1    Dec. 25, 2014

Related U.S. Application Data

(63) Continuation of application No. 14/173,676, filed on Feb. 5, 2014, now Pat. No. 9,300,967.
(Continued)

(51) Int. Cl.
*H04N 7/12*     (2006.01)
*H04N 19/117*   (2014.01)
(Continued)

(52) U.S. Cl.
CPC ......... *H04N 19/117* (2014.11); *H04N 19/136* (2014.11); *H04N 19/186* (2014.11);
(Continued)

(58) Field of Classification Search
CPC .............................. H04N 19/117; H04N 19/70
(Continued)

(56) References Cited

U.S. PATENT DOCUMENTS

2007/0031065 A1   2/2007  Sun
2008/0085061 A1*  4/2008  Arici ........................ G06T 5/20
                                                      382/268
(Continued)

FOREIGN PATENT DOCUMENTS

CN    101094412 A    12/2007
CN    102595127 A    7/2012
(Continued)

OTHER PUBLICATIONS

Tsai et al., "SAO software cleanup and non-normative encoder-only bug-fixes", JCTVC-N0230, 14th JCT-VC Meeting in Vienna, Jul. 25-Aug. 2, 2013, MediaTek Inc., 11 pages.
(Continued)

*Primary Examiner* — Richard T Torrente
(74) *Attorney, Agent, or Firm* — BakerHostetler

(57) ABSTRACT

Offset values, such as Sample Adaptive Offset (SAO) values in video coding standards such as the High Efficiency Video Coding standard (HEVC), may be improved by performing calculations and operations that improve the preciseness of these values without materially affecting the signal overhead needed to transmit the more precise values. Such calculations and operations may include applying a quantization factor to a video sample and at least some of its neighbors, comparing the quantized values, and classifying the video sample as a minimum, maximum, or one of various types of edges based on the comparison. Other sample range, offset mode, and/or offset precision parameters may be calculated and transmitted with metadata to improve the precision of offset values.

5 Claims, 10 Drawing Sheets

Related U.S. Application Data

(60) Provisional application No. 61/836,931, filed on Jun. 19, 2013.

(51) Int. Cl.

| | | |
|---|---|---|
| *H04N 19/70* | (2014.01) | |
| *H04N 19/136* | (2014.01) | |
| *H04N 19/82* | (2014.01) | |
| *H04N 19/44* | (2014.01) | |
| *H04N 19/463* | (2014.01) | |
| *H04N 19/186* | (2014.01) | |
| *H04N 19/86* | (2014.01) | |

(52) U.S. Cl.
CPC ........... *H04N 19/44* (2014.11); *H04N 19/463* (2014.11); *H04N 19/70* (2014.11); *H04N 19/82* (2014.11); *H04N 19/86* (2014.11)

(58) Field of Classification Search
USPC .................................................... 375/240.12
See application file for complete search history.

(56) References Cited

U.S. PATENT DOCUMENTS

| | | | |
|---|---|---|---|
| 2011/0305277 A1 | 12/2011 | Fu et al. | |
| 2013/0022103 A1 | 1/2013 | Budagavi | |
| 2013/0051454 A1 | 2/2013 | Sze et al. | |
| 2014/0023144 A1* | 1/2014 | Park .................. | H04N 19/56 375/240.16 |
| 2014/0140416 A1* | 5/2014 | Yamazaki et al. ........ | 375/240.25 |
| 2014/0177704 A1* | 6/2014 | Pu ..................... | H04N 19/70 375/240.02 |
| 2014/0301438 A1* | 10/2014 | Kim .................... | H04N 19/176 375/240.02 |
| 2014/0348222 A1* | 11/2014 | Hsiang et al. .......... | 375/240.02 |

FOREIGN PATENT DOCUMENTS

| | | | |
|---|---|---|---|
| CN | 103051892 A | | 4/2013 |
| JP | 2013236358 A | | 11/2013 |
| JP | 2016-518770 A | | 6/2016 |
| WO | WO 2012/128540 A2 | | 9/2012 |
| WO | 2012/142966 A1 | | 10/2012 |
| WO | WO 2012176910 A1 | * | 12/2012 |
| WO | 2014/168812 A1 | | 10/2014 |

OTHER PUBLICATIONS

Kim et al., "AhG5: Offset Scaling in SAO for High Bit-depth Video Coding", Input Document for JCT-VC, "Joint Collaborative Team on Video Coding (JCT-VC) of ITU-T SG 16 WP 3 and ISO/IEC JTC 1/SC 29/WG 11," 13th meeting: Incheon, KR, Apr. 18-26, 2013, JCTVC-M0335, Qualcomm Technologies, Inc., 10 pages.
Tsai et al., "SAO software cleanup and non-normative encoder-only bug-fixes", Input Document for JCT-VC, "Joint Collaborative Team on Video Coding (JCT-VC) of ITU-T SG 16 WP 3 and ISO/IEC JTC 1/SC 29/WG 11," JCTVC-N0230, 14th Meeting: Vienna, AT, Jul. 25-Aug. 2, 2013, MediaTek Inc., 8 pages.
Kawamura et al., "AHG7: Adaptive colour-space transform of residual signals", JCTVC-K0193 Presentation, KDDI Corp. (KDDI R&D Labs. Inc.), Oct. 10-19, 2012, 13 pages.
Fu et al., "Sample Adaptive Offset for HEVC", Mediatek Inc., 2011. 5 pages.
Alshina et al., "AhG 18: On SAO Performance at High Bit-Depth and High Bit-Rate", Input Document for JCT-VC, "Joint Collaborative Team on Video Coding (JCT-VC) of ITU-T SG 16 WP 3 and ISO/IEC JTC 1/SC 29/WG 11," 16th Meeting: San Jose, US, Jan. 9-17, 2014, JCTVC-P0222, Samsung Electronics, Ltd., Qualcomm Inc., Apple Inc., MediaTek Inc., 15 pages.
Bross, "High Efficiency Video Coding (HEVC) Text Specification Draft 10 (for FDIS & Last Call)", Input Document for JCT-VC, "Joint Collaborative Team on Video Coding (JCT-VC) of ITU-T SG 16 WP 3 and ISO/IEC JTC 1/SC 29/WG 11," 12th Meeting: Geneva, CH, Jan. 14-23, 2013, JCTVC-L1003_v34, 310 pages.
Kim et al., "AhG5: Offset Scaling in SAO for High Bit-depth Video Coding", JCTVC-M0335, Qualcomm CDMA Technologies, Version 4, Apr. 23, 2013, 10 pages.
"AhG 18: On SAO Performance at High Bit-Depth and High Bit-Rate", Samsung Electronics, Ltd., Qualcomm Inc., Apple Inc., MediaTek Inc., Version 4, Jan. 17, 2014, 17 pages.
International Search Report and Written Opinion of the International Search Authority in counterpart International Application No. PCT/US2014/036375, dated Jul. 31, 2014, 12 pages.
Chih-Ming Fu et al., "Sample Adaptive Offset with PPS-level Syntax", Joint Collaborative Team on Video Coding (JCT-VC) of ITU-T SG16 WP3 and ISO/IEC JTC1/SC29/WG11, XP030049034, Document: JCTVC-F058, 6th Meeting: Torino, IT, Jul. 14-22, 2011, 4 pages.
Chih-Ming Fu et al., "Sample Adaptive Offset for Chroma", Joint Collaborative Team on Video Coding (JCT-VC) of ITU-T SG16 WP3 and ISO/IEC JTC1/SC29/WG11, XP030049033, Document: JCTVC-F057, 6th Meeting: Torino, IT, Jul. 14-22, 2011, 6 pages.
Shih-Ta Hsiang et al., "AHG5: Modified SAO for Range Extensions", Joint Collaborative Team on Video Coding (JCT-VC) of ITU-T SG16 WP3 and ISO/IEC JTC1/SC29/WG11, XP030114763, Document: JCTVC-N0246, 14th Meeting: Vienna, AT, Jul. 25-Aug. 2, 2013, 6 pages.
Benjamin Bross, "High Efficiency Video Coding (HEVC) Text Specification Draft 10 (for FDIS & Consent)", Joint Collaborative Team on Video Coding (JCT-VC) of ITU-T SG16 WP3 and ISO/IEC JTC1/SC29/WG11, XP030113948, Document: JCTVC-L1003_v1, 12th Meeting: Geneva, CH, Jan. 14-23, 2013, 322 pages.
Bross et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 310 pages (JCTVC-L1003_v34).
Bross et al.; High Efficiency Video Coding (HEVC) Text Specification Draft 10 (for FDIS & Last Call); Joint Collaborative Team on Video Coding (JCT-VC); ITU-T SG 16 WP3 and ISO/IEC JTC 1/SC 29/WG11 12th Meeting: Geneva, CH; Jan. 2013; Document No. JCTVC-L1003_v34; p. 32, 65, 86, 159.
Wei, Pu; "Multi-Type Inter Layer Sample Adaptive Offset Filter"; Joint Collaborative Team on Video Coding; Document JCTVC-L0233; Jan. 14-23, 2013; 4 pages.
Wei, Pu; "High Frequency Pass Inter Sample Adaptive Offset Filter"; Joint Collaborative Team on Video Coding; Document JCTVC-L0234; Jan. 14-23, 2013; 4 pages.
Minoo et al.; "Non-CE8: Modified E0 offset operation and offset quantization"; JCTVC-H0552; Joint Collaborative Team on Video Coding (JCT-VC) of ITU-T SG16 WP3 and ISO/IEC JTC1/SC29/WG11 8$^{th}$ Meeting; Feb. 2012; 7 pages.
Bross, Benjamin; High Efficiency Video Coding (HEVC) text specification draft 10 (for FDIS & Consent):; JCTVC-L1003; Joint Collaborative Team on Video Coding (JCT-VC) of ITU-T SG16 WP3 and ISO/IEC JTC1/SC29/WG11 12$^{th}$ meeting; Jan. 2013; p. 32, 66, 88 and 163.

\* cited by examiner

FIG. 1
100

- Identify a quantization factor (T), a value (p) of a video sample, and a value ($n_0$, $n_1$) of at least two of its neighbors 101
- Divide each of the values by the quantization factor (p/T), ($n_0$/T), and ($n_1$/T) 102
- Round each of the Divided Values round(p/T), round($n_0$/T), and round($n_1$/T) 105
- Perform ceiling/floor calculation on each of the divided values 106
- Compare the divided sample value (p/T) to each of its neighbors ($n_0$/T), and ($n_1$/T) 103
- Classify the Video Sample as one of: a Minimum, a First Edge Type, a Second Edge Type, a Maximum, or None Based on the Comparing 104

200

300

600

700

800

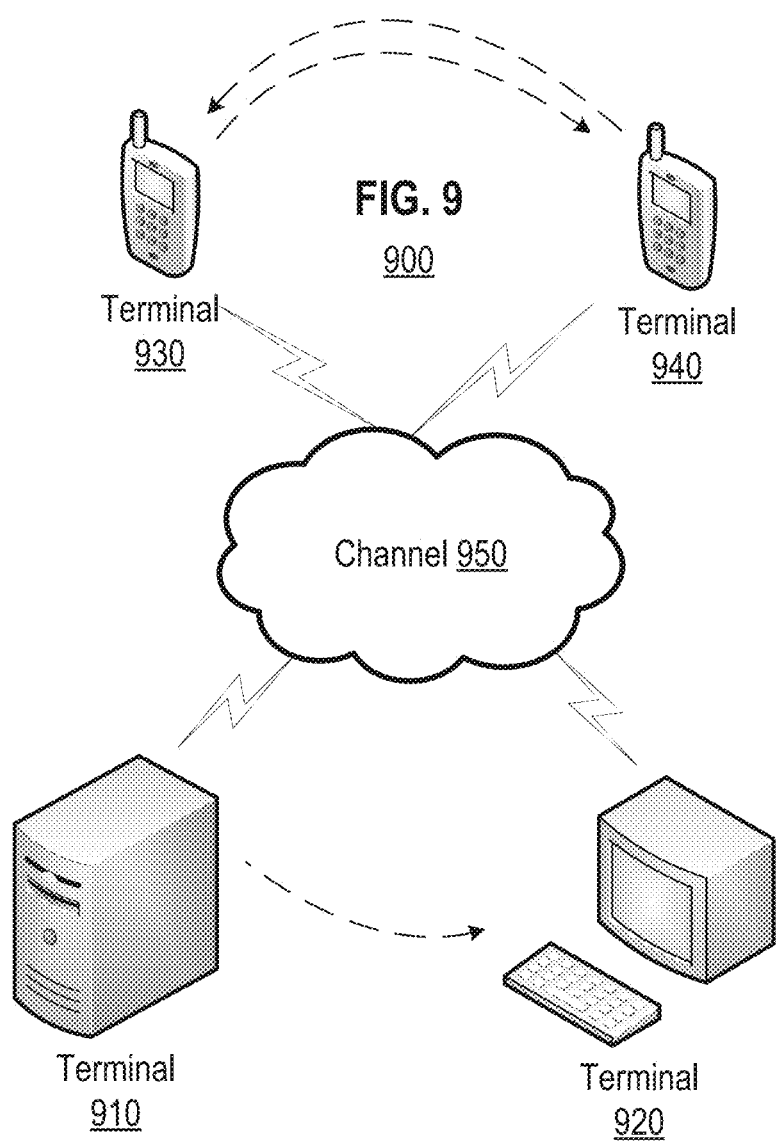

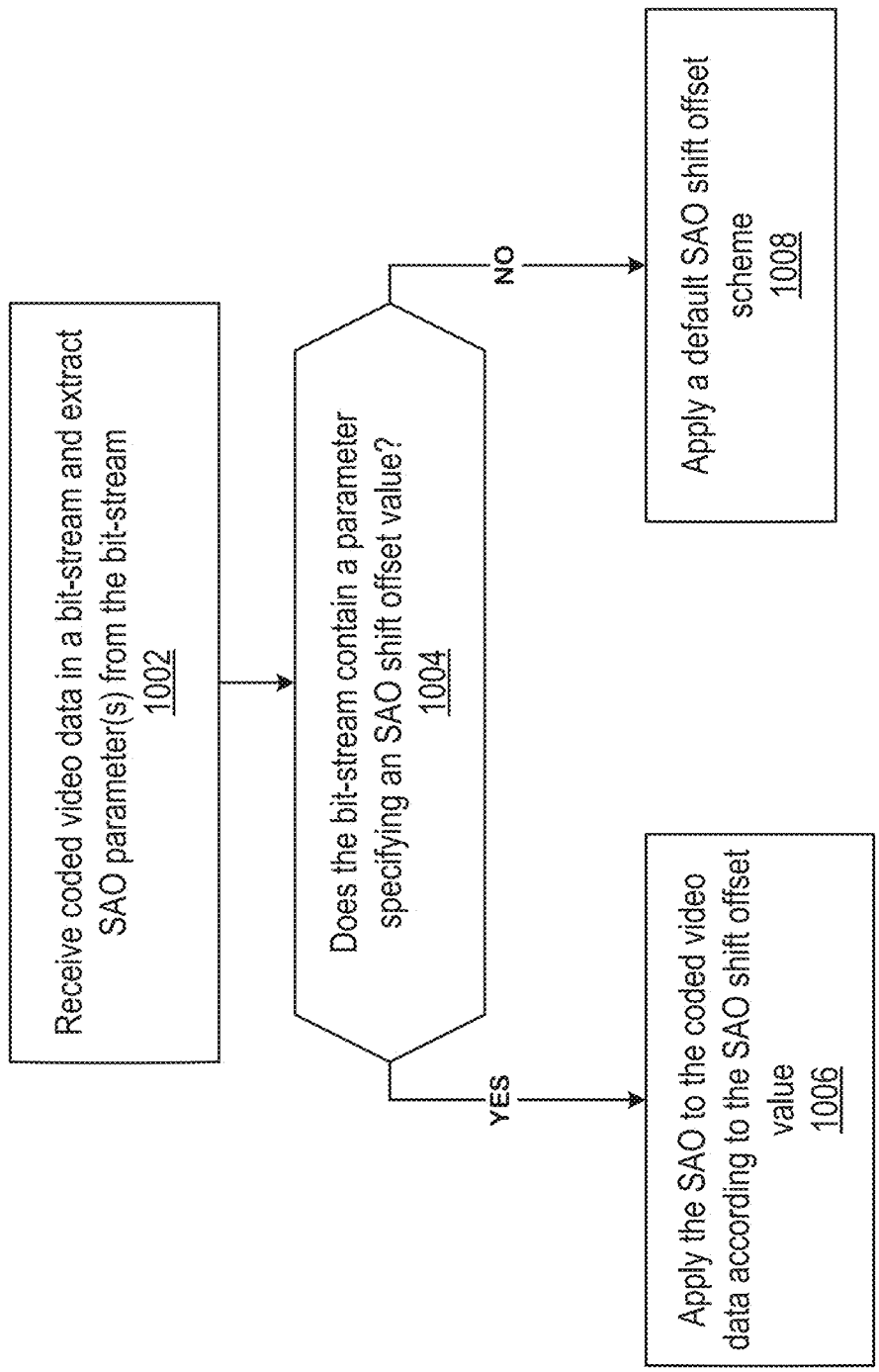

SAMPLE ADAPTIVE OFFSET CONTROL

CROSS-REFERENCE TO RELATED APPLICATIONS

This application is a continuation of U.S. patent application Ser. No. 14/173,676, filed Feb. 5, 2014, and claims the benefit of U.S. Provisional Application Ser. No. 61/836,931, filed Jun. 19, 2013, each of which is incorporated herein by reference in its entirety.

BACKGROUND

The present invention relates to a method of reconstructing signal amplitudes for video coding and compression. More specifically, it relates to methods for quantization and adaptive dynamic range signaling in Sample Adaptive Offset (SAO) processes in video coding and processing systems such as within the High Efficiency Video Coding (HEVC) standard.

The HEVC standard, currently published as ISO/IEC 23008-2 MPEG-H Part 2 and ITU-T H.265, introduced several new video coding tools designed to improve video coding efficiency over previous video coding standards and technologies, including, but not limited to MPEG-2, MPEG-4 Part 2, MPEG-4 AVC/H.264, VC1, and VP8. One of these tools is the SAO, which is a filtering mechanism typically performed after deblocking filtering. The process may be in-loop, e.g., impacting subsequent pictures that may use an SAO processed picture as a reference, or out of loop, e.g., only impacting display or other subsequent processing outside an encoder. SAO groups reconstructed pixels into categories and reduces distortion by applying an offset to pixel values based on a predefined categorization or classification process.

SAO, as defined in the HEVC specification, supports two operating modes: an edge offset mode and a band offset mode. In the edge offset mode, the value of a predetermined sample may be compared to two of eight neighboring samples in a horizontal, vertical, or diagonal direction. Based on a simple direct comparison of sampled values, the predetermined sample may be classified into one of several categories. In the band offset mode, the amplitude of a predetermined sample may be used to categorize the sample into 1 of 32 bands. An offset may be specified for the sample if it is categorized into 1 of 4 contiguous bands in the set of 32 bands for which SAO supports an offset parameter.

The existing HEVC standard includes limitations on SAO methods with respect to classification and overhead. In this regard, the classification process is limited by bitdepth, precision, color, and the number of bands used for the classification. To reduce the overhead needed to signal offset values, the existing HEVC standard limits both the number of bands into which an offset may be provided, and also the ability to specify precise offset values for each of the different pixel categories. For example, limiting the maximum value of offset values for bit depths above 10 bits reduces the preciseness of SAO values at higher bit depths in favor of an increased dynamic range covered by the SAO values. However, in some instances, higher precision of SAO values may be more important for image quality purposes than a high dynamic range, such as when the offset to be added is within a small range. There is therefore a need for a more flexible approach to SAO that is able to classify samples with less susceptibility to noise, and to expand the precision of applied offsets while minimizing the impact on the dynamic range of the offset values and/or the signal overhead needed to transmit these offsets.

BRIEF DESCRIPTION OF THE DRAWINGS

FIG. 1 is a flowchart illustrating a method for quantization according to an embodiment of the present invention.

FIG. 9 is a block diagram of a multi-terminal system according to an embodiment of the present invention.

FIG. 10 is a flowchart illustrating a method for determining and signaling a dynamic range and/or precision of sample adaptive offset.

DETAILED DESCRIPTION

Figure 2:
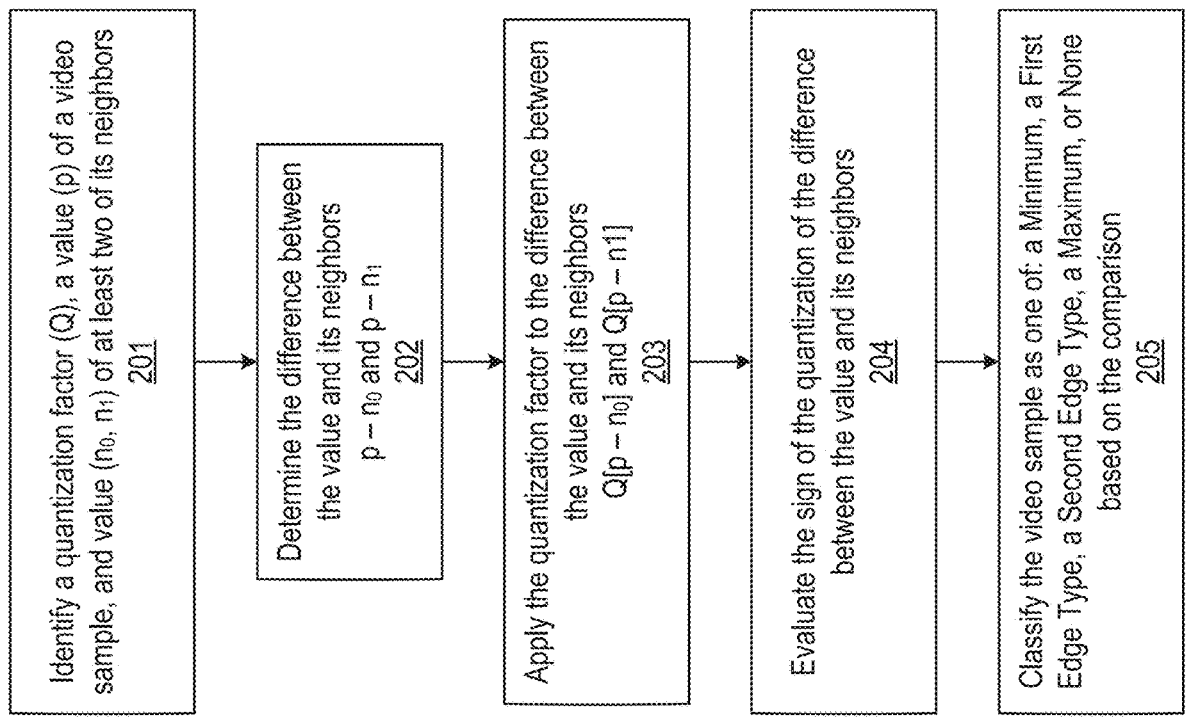
FIG. 2 is a flowchart illustrating another method for quantization according to an embodiment of the present invention.

Embodiments of the present invention provide techniques for reducing and controlling the impact of noise on and/or accommodating a bit-depth for offset values of samples. Such techniques may be applied for sample adaptive offset (SAO) processes, as well as post-processing.

In one embodiment, an additional, optional quantization step may be performed during a categorization or classification process. In the classification process, sample values may be classified into distinct groups before being compared in order to reduce a noise sensitivity of the offset value. In another embodiment, sample range, offset mode, and offset precision parameters may also be calculated and transmitted with metadata associated with sampled video data to improve the application of offsets in other embodiments.

In another embodiment, video data may be converted to a second color space having components that are better suited for applying offset values. Once the offset values have been applied in the second color space, the video data with the applied offset may be converted back to the first color space. Again, in this instance, if identification information about the second color space is to be transmitted, minimal overhead may be needed to transmit this identification information.

In another embodiment, offset values for certain bands that are not able to be expressly signaled due to limited signal overhead, may instead be interpolated from offset values that were expressly signaled. This interpolation may occur by expressly signaling non-adjacent bands and then interpolating the offset values associated with the intermediate bands situated between the expressly signaled non-adjacent bands. Bands may also be split non-uniformly so that some bands have different widths and/or encompass a broader range of values than other bands. These embodiments may enable offset values to be applied more precisely in particular sections of the image most affected by offsets.

Quantization and Classification of Samples

SAO may include classifying reconstructed samples into various categories, obtaining an offset for each category, and adding the obtained offset to each sample in the category. The offset for each category may be calculated at the encoder and signaled to the decoder. Classification of samples may be performed at both the encoder and the decoder. Quantization may mask noise in the content, and provide better focus on edges of the video content. In those instances when information about the specific quantization factor used is to be transmitted, only the specific quantization value need be transmitted. The overhead may be further reduced by using the same quantization factor for multiple samples. Additional sample range, offset mode, and offset precision parameters may also be calculated and transmitted with metadata associated with sampled video data to improve the application of offsets in other embodiments. A quantization parameter may be introduced to assist edge classification by checking not only whether samples are distant, but also how distant they are. The quantization parameter may also be used to determine whether the absolute difference between neighbor samples is larger than a threshold, where the threshold may be precise or quantized. The quantization parameter may also quantize the difference between neighbor samples and perform classification based on the quantized differences. Conventional edge offset determinations are based on a direct comparison, using a greater than/less than/equal to criterion, of the current sample value as compared to that of its neighbors but they are easily skewed by noise, especially at higher bit depths. The quantization parameter techniques discussed herein are expected to reduce sensitivity to such noise effects.

In a first embodiment, all samples to be processed may be quantized using a quantization factor. The quantization factor may include a divisor by which a given sample value and sample values of its neighbors are divided. The quantized samples may be rounded. The rounded results may then be used as parameters for the classification process. In some instances, other operations, such as a ceiling or floor calculation, may be performed on the quotient in addition to or as an alternative to rounding. For example, if the value of the divisor is a power of 2, then the division operation may be simplified by using a shift operation or a bitwise AND mask instead, which may conserve memory resources, and is further described herein. The decision process may then categorize samples based on the new quantized samples. Table 1 shows exemplary conditions for classifying different edge types in the edge offset mode based on this embodiment. In Table 1, T, which may be a floating point number, corresponds to the divisor.

TABLE 1

Exemplary Classification Criteria Using Quantized Samples

| EDGEIDX | CONDITION | CLASSIFICATION |
|---|---|---|
| 0 | None of the above | Monotonic Area |
| 1 | round(p/T) < round($n_0$/T) and round(p/T) < round($n_1$/T) | Local Min |
| 2 | round(p/T) < round($n_0$/T) and round(p/T) = round($n_1$/T) or | First Edge Type |

TABLE 1-continued

Exemplary Classification Criteria Using Quantized Samples

| EDGEIDX | CONDITION | CLASSIFICATION |
|---|---|---|
|  | round(p/T) < round($n_1$/T) and round(p/T) = round($n_0$/T) | |
| 3 | round(p/T) > round($n_0$/T) and round(p/T) = round($n_1$/T) or round(p/T) > round($n_1$/T) and round(p/T) = round($n_0$/T) | Second Edge Type |
| 4 | round(p/T) > round($n_0$/T) and round(p/T) > round($n_1$/T) | Local Max |

FIG. 1 shows an exemplary method 100 according to the first embodiment. In step 101, a quantization factor (T), a value of a predetermined video sample (p), a value of a first neighbor ($n_0$) to the predetermined video sample, and a value of a second neighbor ($n_1$) to the predetermined video sample may be identified. In step 102, each of the identified values (p, $n_0$, $n_1$) may be divided by the quantization factor (T). In step 103, the divided sample value (p/T) may be compared to divided values of its neighbors ($n_0$/T) and ($n_1$/T).

In some instances, before the comparison occurs, a function may be applied to one or more of the divided values (p/T), ($n_0$/T), and/or ($n_1$/T), to associate these divided values with more general categories. For example, in some instances, such as in box 105, a rounding function may be applied to each of the divided values so that each of the divided values is associated with a corresponding whole number. The associated whole numbers may then be compared to each other in step 103. Different functions may be applied in other instances. For example, in box 106, a floor or ceiling calculation function may be applied to each of the divided values before comparing the values to each other in step 103. Other functions may also be used in other embodiments. In step 104, the predetermined video sample may be classified as one of: a minimum, a first edge type, a second edge type, a maximum, and none of these, based on the comparison made in step 103. Table 1 above shows exemplary criteria for classifying a video sample as one of these types based on the comparing in step 103. Exemplary comparing criteria are shown in the condition column in Table 1.

In a further embodiment, classification of edge types may be based on quantization of differences between a sampled value and its neighbors, where the differences between the sampled value and its neighbors may be evaluated according to conventional SAO methods. Table 2 shows exemplary conditions for classifying different edge types in the edge offset mode based on this embodiment.

TABLE 2

Exemplary Classification Criteria Using Quantized Differences between Samples

| EDGE INDEX | CONDITION | CLASSIFICATION |
|---|---|---|
| 0 | None of the above | Monotonic Area |
| 1 | Q[p − $n_0$] < 0 and Q[p − $n_1$] < 0 | Local Min |
| 2 | Q[p − $n_0$] < 0 and Q[p − $n_1$] = 0 or Q[p − $n_1$] < 0 and Q[p − $n_0$] = 0 | First Edge Type |

TABLE 2-continued

Exemplary Classification Criteria Using Quantized Differences between Samples

| EDGE INDEX | CONDITION | CLASSIFICATION |
|---|---|---|
| 3 | $Q[p - n_0] > 0$ and $Q[p - n_1] = 0$ or $Q[p - n_1] > 0$ and $Q[p - n_0] = 0$ | Second Edge Type |
| 4 | $Q[p - n_0] > 0$ and $Q[p - n_1] > 0$ | Local Max |

FIG. 2 shows an exemplary method 200 according to the second embodiment. In step 201, a quantization factor (Q), a value of a predetermined video sample (p), a value of a first neighbor ($n_0$) to the predetermined video sample, and a value of a second neighbor ($n_1$) to the predetermined video sample may be identified. In step 202, the differences ($p-n_0$ and $p-n_1$) between the predetermined video sample (p) and each of its neighbors ($n_0$, $n_1$) may be determined. In step 203, the quantization factor (Q) may be applied to each of the differences between the value and its neighbors determined in step 202 as further described herein. In step 204, the method 200 may evaluate the sign of the quantization of each of the differences between the predetermined video sample value and its neighbors. In step 205, the predetermined video sample (p) may be classified as one of: a minimum, a first edge type, a second edge type, a maximum, and none of these, based on the evaluation made in step 204. Table 2 above shows exemplary criteria for classifying a video sample as one of these types based on the evaluation made in step 204. Exemplary comparing criteria are shown in the condition column in Table 2.

In yet another embodiment, all samples to be processed may be quantized using the same quantizer Q. The decision process may then categorize samples based on the new quantized samples. The quantization parameter may reduce the dynamic range of samples by quantizing them to lower precision before edge classification. By quantizing samples once, then reusing the quantized value for all neighborhood decisions, this embodiment may conserve memory resources. Table 3 below shows exemplary conditions for classifying different edge types in the edge offset mode based on this embodiment. In Table 3, and the other tables herein (unless indicated otherwise), p corresponds to the value of a given sample, $n_0$ corresponds to a value of a first directional neighbor (typically in a horizontal, vertical, or diagonal direction) from the given sample, $n_1$ corresponds to a value of a second directional neighbor (typically opposite that of the first direction in the horizontal, vertical, or diagonal direction) from the given sample, and Q corresponds to the quantization factor.

TABLE 3

Exemplary Classification Criteria Using Quantized Samples

| EDGE INDEX | CONDITION | CLASSIFICATION |
|---|---|---|
| 0 | None of the above | Monotonic Area |
| 1 | $Q[p] < Q[n_0]$ and $Q[p] < Q[n_1]$ | Local Min |
| 2 | $Q[p] < Q[n_0]$ and $Q[p] = Q[n_1]$ or $Q[p] < Q[n_1]$ and $Q[p] = Q[n_0]$ | First Edge Type |
| 3 | $Q[p] > Q[n_0]$ and $Q[p] = Q[n_1]$ or $Q[p] > Q[n_1]$ and $Q[p] = Q[n_0]$ | Second Edge Type |
| 4 | $Q[p] > Q[n_0]$ and $Q[p] > Q[n_1]$ | Local Max |

Figure 3:
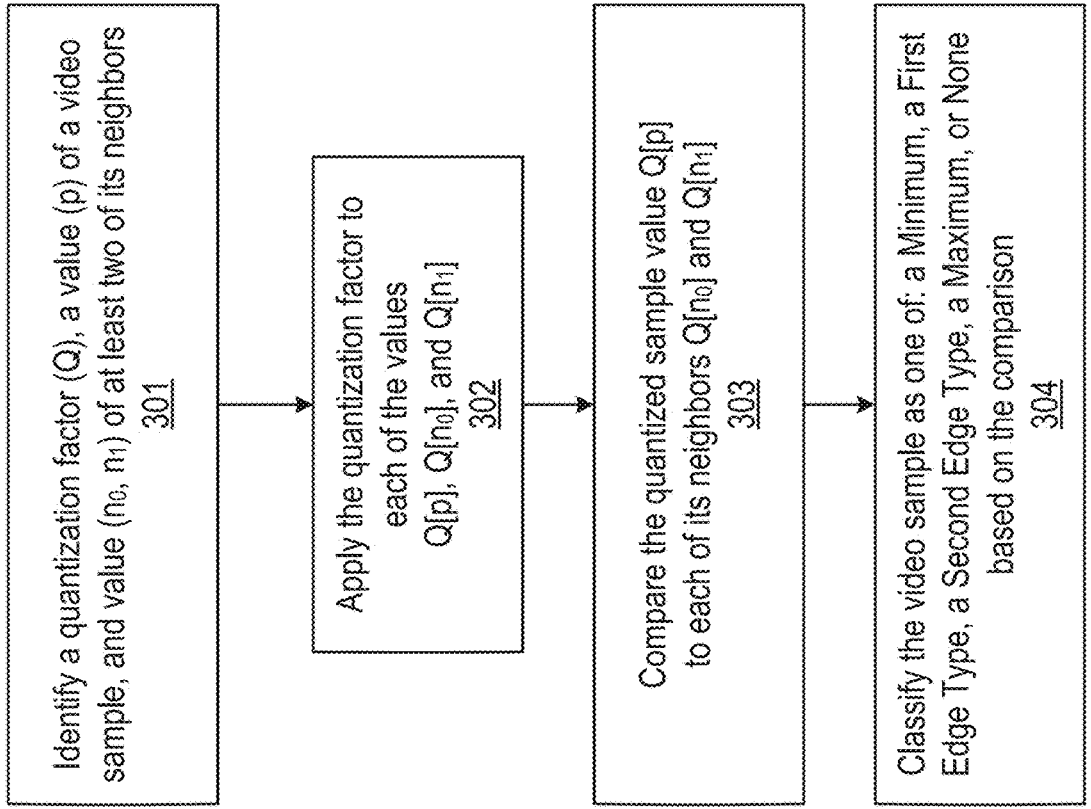
FIG. 3 is a flowchart illustrating another method for quantization according to an embodiment of the present invention.

FIG. 3 shows an exemplary method 300 according to the third embodiment. In step 301, a quantization factor (Q), a value of a predetermined video sample (p), a value of a first neighbor ($n_0$) to the predetermined video sample, and a value of a second neighbor ($n_1$) to the predetermined video sample may be identified. In step 302, the quantization factor (Q) may be applied to each of the identified values (p, $n_0$, $n_1$). For example, the quantization may be a rounding function as described in relation to Table 1 above. In this example, Table 3 is a generalization of Table 1. In step 303, the quantized sample value Q[p] may be compared to quantized values of its neighbors $Q[n_0]$ and $Q[n_1]$. In step 304, the predetermined video sample (p) may be classified as one of: a minimum, a first edge type, a second edge type, a maximum, and none of these, based on the comparison made in step 303. Table 3 above shows exemplary criteria for classifying a video sample as one of these types based on the comparison made in step 303. Exemplary comparing criteria are shown in the condition column in Table 3.

With respect to each of the embodiments described herein, the quantization process may be a shift operation, such as a shift right operation, by j bits. In some instances, the shift operation may further include rounding control. In one mode of the quantization process, the quantization step size may be dynamically computed based on the bit-depth of the samples. For example, samples may be quantized to their eight most significant bits. In other words, where bitDepth represents the bit-depth of the sample to be processed and N (which replaces j) is fixed based on the bitDepth, i.e. N=bitDepth−8, quantization may be performed as Q1(x)= x>>N for the FIG. 1 and FIG. 3 embodiments discussed herein.

In an embodiment, the quantization may be performed using a sample x and a quantization factor j for the FIG. 2 embodiment discussed herein as follows:

$Q2(x,j)=\text{floor}(x/(2^j))=\text{sign}(x)*(\text{abs}(x)>>j)$ $Q3(x,j)=((x+(1<<(j-1)))>>j)$ Quantization methods Q1 and Q3 are similar. For example, if positive and negative values are not separated, there is a negative bias, so the value would never become 0, if negative, and the sample may be shifted right without a rounding factor.

The quantization methods can be alternatively conceptualized in a coding tree modification process, in which the value of the edge index, edgeIdx, may be derived as follows:

edgeIdx=2+Sign(recPicture[xSi][ySj]−recPicture[xSi+ hPos[0]][ySj+vPos[0]])+Sign(recPicture[xSi] [ySj]−recPicture[xSi+hPos[1]][ySj+vPos[1]])

When quantization is applied according to an embodiment as in the present invention, edge index may be derived by replacing sign with SignQuant as follows:

edgeIdx=2+SignQuant(recPicture[xSi][ySj]−recPicture[xSi+hPos[0]][ySj+vPos[0]])+SignQuant (recPicture[xSi][ySj]−recPicture[xSi+hPos[1]] [ySj+vPos[1]])

where SignQuant may be:

$$SignQuant(x, j) = \begin{cases} 1, & x > (1 \ll j) \\ -1, & x < -(1 \ll j) \\ 0, & \text{otherwise} \end{cases}$$

In an alternative embodiment, this could be as:

edgeIdx=2+Sign(Q(recPicture[xSi][ySj]−recPicture [xSi+hPos[0]][ySj+vPos[0]]))+Sign(Q(recPicture [xSi][ySj]−recPicture[xSi+hPos[1]][ySj+vPos [1]]))

with Q being a quantization method as described previously, for example Q may be Q2 or Q3. In a further embodiment, it may also be as follows:

edgeIdx=2+Sign($Q1$(recPicture[$xSi$][$ySj$])−$Q1$(recPicture[$xSi+hPos$[0]][$ySj+vPos$[0]]))+Sign($Q1$(recPicture[$xSi$][$ySj$])−$Q1$(recPicture[$xSi+hPos$[1]][$ySj+vPos$[1]]))

In another mode of the quantization process, j may be signaled for each color component. The signaling may be performed in the slice header, providing the advantage of minimizing overhead. For example, the slice segment header may be modified as follows, where slice_sao_luma_thres_scale and slice_sao_chroma_thres_scale specify the thresholds that may be used for comparison in quantizing sampled video values in the edge offset classification discussed herein, for each of the luma and chroma components:

|  | Descriptor |
|---|---|
| slice_segment_header( ) { | |
| ... | |
| if (sample_adaptive_offset_enabled_flag) { | |
| slice_sao_luma_flag | u(1) |
| slice_sao_chroma_flag | u(1) |
| if (ChromaArrayType != 1) { | |
| slice_sao_luma_thres_scale | ue(v) |
| slice_sao_chroma_thres_scale | ue(v) |
| } | |
| } | |
| ... | |
| } | |

The signaling may also be performed in the SAO syntax, adapted for a coding tree unit, at the PPS or at the SPS level. This mode may provide greater flexibility by dissociating quantization from a predetermined number of most significant bits by which samples are quantized, and the quantization parameter can be signaled at various levels.

Signaling Dynamic Range and Precision Parameters

In one embodiment, for both edge offset and band offset classification methods, the precision of SAO may be expanded while constraining the signaling overhead and preserving the dynamic range by supporting the signaling of additional parameters. These additional parameters may include parameters specifying a dynamic range and/or precision of the signaled offsets.

Although SAO is designed to better reconstruct original signal amplitudes, SAO performance may be poor, particularly at high bit-rates and bit-depths in the existing HEVC standard. In SAO, a picture and correcting offsets are received in a bit-stream. The samples of a reconstructed picture are classified into categories, and correcting offsets corresponding to the categories are added onto the reconstructed picture samples after deblocking. In the existing HEVC standard, the magnitude of the coded offset values is limited to a maximum value of (1<<(Min(bitDepth, 10)−5))−1, while the sign values are either signaled in the bit stream (e.g., in the band offset method), or predefined for each edge category. Thus, the final offset value may be calculated as:

SaoOffset=offsetSign*saoOffsetAbs<<(bitDepth−Min(bitDepth,10))

Where offsetSign is the specified sign for an offset, saoOffsetAbs is the signaled offset magnitude, and bitDepth is the specified bit-depth of the samples processed. The SaoOffset may be separately defined and signaled for each color component as further described herein. For example, the offset range for 8 bit data is within [−7, 7], 10 bit data is within [−31, 31], and 12 bit data is within [−31, 31]*4. Quantization is represented in the above equation as the right shifted portion, i.e., <<(bitDepth−Min(bitDepth, 10)). In other words, quantization in the existing HEVC standard is applied for bit-depths over 10.

However, this calculation method may result in poor performance. For example, for either the edge or band offset SAO methods, the offsets to be signaled, given a certain optimization model (e.g. using the least mean squares method), may lie within a limited and rather small range. However, when the final SAO offset value is determined for signaling, given additional constraints such as coding, as well as the rounding, quantization, and clipping constraints required by the HEVC standard (for bit-depths higher than 10), after quantization, these offsets may end up either in their majority or as a whole be completely quantized down to zero. This would reduce the effectiveness of SAO, or even completely turn off SAO, which negatively impacts the overall coding efficiency.

Thus, SAO performance may be improved by removing quantization and/or adjusting the quantization for a given bit-depth. In an embodiment, a parameter specifying the precision of the SAO offsets may be provided. Instead of applying a fixed scaling factor to adjust the offset parameters by a fixed, bit-depth dependent quantity, a varying scaling parameter may be provided. The scaling parameter may specify a particular scaling factor that is to be applied to particular samples.

FIG. 10 is a flowchart illustrating a method 1000 for determining and signaling a dynamic range and/or precision of sample adaptive offset. In a first step 1002, the method 1000 receives coded video data in a bit-stream, and may extract parameters specifying how the SAO offset is to be applied from the bit-stream. In some instances, a saoShiftOffset parameter may be used to signal a particular scaling factor. In step 1004, method 1000 determines whether the bit-stream contains a parameter specifying an SAO shift offset value. For example, legacy systems might not transmit a parameter specifying how SAO offset is to be applied. If no parameter specifying how to apply SAO offset is extractable, the method 1000 then proceeds to step 1008 in which a default SAO offset scheme is applied. For example, if saoShiftOffset is not signaled, not received, or not present, then the offsets may be scaled in accordance with an existing fixed scaling scheme (i.e., applying quantization for bit-depths over 10). If method 1000 does extract an SAO offset parameter, then the method proceeds to step 1006, in which SAO is applied to the video according to the parameter. For example, the offset may be shifted by a quantity specified by the saoShiftOffset parameter according to the exemplary code below:

```
if (saoShiftOffset is not present)
    SaoOffset = offsetSign * saoOffsetAbs << ( bitDepth − Min(
        bitDepth, 10 ))
else
    SaoOffset = offsetSign * saoOffsetAbs << saoShiftOffset
```

In alternative embodiments, criteria may also be specified to limit the instances in which customized offset scaling is used. For example, additional criteria may be specified to only allow customized offset scaling if bitDepth is larger than 10, while also limiting the dynamic range within the current maximum sample value given the specified bitDepth based on the saoMaxLogOffsetAbs quantity.

In an embodiment, the parameter SaoOffset may be signaled in the picture parameter set (PPS). In an alternative embodiment, the parameter may be expressly signaled in the sequence parameter set (SPS), slice header, or other metadata associated with the encoded video data. In some instances, these additional parameters may be supported in new profiles different from the already defined profiles in HEVC, such as the Main, Main-10, and Main Still profiles. The parameters may be signaled for each largest coding unit (LCU), while prediction mechanisms between LCUs can reduce the signaling overhead.

The parameters may be defined for each color component, which may but need not be similar to each other. Thus, each color component may have its own saoOffset parameter associated with it. For example, the luma component may have its own saoOffset parameter and the chroma component may have its own saoOffset parameter. In alternative embodiments, different color components may use the same saoOffset parameter or a same set of saoOffset parameters.

For example, the parameter SaoOffset may be signaled by parameters sao_luma_bit_shift and sao_chroma_bit_shift in the picture parameter set raw byte sequence payload (RBSP) syntax as follows:

|  | Descriptor |
| --- | --- |
| pic_parameter_set_rbsp( ) { | |
| ... | |
|   if( pps_extension1_flag ) { | |
|     if( transform_skip_enabled_flag ) | |
|       log2_max_transform_skip_block_size_minus2 | ue(v) |
|     luma_chroma_prediction_enabled_flag | u(1) |
|     chroma_qp_adjustment_enabled_flag | u(1) |
|     if( chroma_qp_adjustment_enabled_flag ) { | |
|       diff_cu_chroma_qp_adjustment_depth | ue(v) |
|       chroma_qp_adjustment_table_size_minus1 | ue(v) |
|       for( i = 0; i <= | |
|       chroma_qp_adjustment_table_size_minus1; i++ ) { | |
|         cb_qp_adjustment[ i ] | se(v) |
|         cr_qp_adjustment[ i ] | se(v) |
|       } | |
|     } | |
|     sao_luma_bit_shift | ue(v) |
|     sao_chroma_bit_shift | ue(v) |
|     pps_extension2_flag | u(1) |
|   } | |
|   if( pps_extension2_flag ) | |
|     while( more_rbsp_data( ) ) | |
|       pps_extension_data_flag | u(1) |
|   rbsp_trailing_bits( ) | |
| } | | sao_luma_bit_shift may specify the parameter used to derive the SAO offset values for luma samples. The value of sao_luma_bit_shift may be in the range of 0 to $BitDepth_Y-6$, inclusive. When not present, the value of sao_luma_bit_shift may inferred to be equal to 0, in which case, quantization may be performed according to the existing HEVC standard. sao_chroma_bit_shift may specify the parameter that is used to derive the SAO offset values for the chroma samples. The value of sao_chroma_bit_shift may be in the range of 0 to $BitDepth_C-6$, inclusive. When not present, the value of sao_chroma_bit_shift is inferred to be equal to 0, in which case, quantization may be performed according to the existing HEVC standard.

In some instances, a maximum allowable value for the signaled offset quantities, saoOffsetAbs, may also be included in the parameter or as an additional parameter. The maximum allowable value may be encoded as is, or it may be more efficiently encoded by taking its base 2 logarithm, saoMaxLogOffsetAbs. In this instance, a maximum allowable offset may be specified as:

saoMaxOffset=(1<<saoMaxLogOffsetAbs)−1

In some instances, the entropy coding process (cmax) of saoOffsetAbs may be affected by this encoding. In an alternative embodiment, since the current maximum value may be set to be equal to (1<<(Min(bitDepth, 10)−5))−1, a few bits may be saved by signaling a saoDeltaMaxLogOffsetAbs and setting saoMaxLogOffsetAbs as being equal to:

saoMaxLogOffsetAbs=(Min(bitDepth,10)−5)+ saoDeltaMaxLogOffsetAbs

If saoDeltaMaxLogOffsetAbs is equal to 0, then an existing dynamic range may be used, otherwise an expanded dynamic range may be provided.

In an alternative embodiment, the adaptive dynamic range signaling may be provided and extracted at a slice level control. For example, SaoOffsetVal[cIdx][rx][ry][i] for i ranging from 0 to 4, inclusive, may be derived as follows:

```
SaoOffsetVal[ cIdx ][ rx ][ ry ][ 0 ] = 0
for( i = 0; i < 4; i++ ) {
SaoOffsetVal[ cIdx ][ rx ][ ry ][ i + 1 ] = offsetSign * sao_offset_abs[
cIdx ][ rx ][ ry ][ i ]
}
```

In an alternative embodiment the adaptive dynamic range signaling may be provided and extracted at a sequence level control as follows:

|  | Descriptor |
| --- | --- |
| seq_parameter_set_rbsp( ) { | |
| ... | |
|   sample_adaptive_offset_enabled_flag | u(1) |
| ... | |
|   sps_extension_present_flag | u(1) |
|   if( sps_extension_present_flag ) { | |
|     for( i = 0;i< 1; i++ ) | |
|       sps_extension_flag[ i ] | u(1) |
|     sps_extension_7bits | u(7) |
|     if( sps_extension_flag[ 0 ] ) { | |
|       transform_skip_rotation_enabled_flag | u(1) |
|       transform_skip_context_enabled_flag | u(1) |
|       intra_block_copy_enabled_flag | u(1) |
|       implicit_rdpcm_enabled_flag | u(1) |
|       explicit_rdpcm_enabled_flag | u(1) |
|       extended_precision_processing_flag | u(1) |
|       intra_smoothing_disabled_flag | u(1) |
|       high_precision_offsets_enabled_flag | u(1) |
|       fast_rice_adaptation_enabled_flag | u(1) |
|       if (sample_adaptive_offset_enabled_flag) | |
|         sao_quant_enabled_flag | u(1) |
|     } | |
| ... | |
|   } | |
|   rbsp_trailing_bits( ) | |
| } | |

When sao_quant_enabled_flag is 1, the decoder may be alerted that quantization is to be applied for sao_offset_abs. sao_quant_enabled_flag equals 0 may indicate that quantization for sao_offset_abs is not to be used. When not present, the value of sao_quant_enabled_flag is inferred to be equal to 0, in which case, quantization may be performed according to the existing HEVC standard Additionally, while HEVC applies SAO as an in-loop processing mechanism, one or more of the embodiments described herein may be applied as part of the in-loop SAO processing mechanism or they may be applied as post-processing mechanisms independent of a codec such as HEVC. For those embodiments that are applied as codec-independent post-processing mechanisms, SAO metadata could still be signaled within the codec using a carrier mechanism, including but not limited to Supplemental Enhancement Information (SEI) messages, MPEG-2 systems' User Specified Metadata, or other mechanisms. Additionally, embodiments of the invention may be included in other codecs that may provide for some form of SAO. These other codecs may include future codecs or extensions of HEVC, such as the scalable or 3D/multiview extensions of HEVC.

Applying SAO in Converted Color Spaces

In addition to supporting the YUV 4:2:0 color space, HEVC also supports other color spaces and color sampling formats such as YUV 4:2:2 and YCoCg, YCoCg-R or RGB 4:4:4 among others. In different embodiments, SAO may be applied in different color spaces from a native color space of video data. Applying SAO in a different color space may enable offsets to be specified more precisely for particular parameters associated with a particular color space, such as a chrominance parameter instead of a particular color value like in the RGB color space.

SAO may be applied in non-native color spaces by converting image data into a different color space and sampling format, such as from 4:2:0 to 4:4:4, applying SAO in the different color space and sampling format, and then converting the image data back to the native color space and sampling format. For example, if the native encoding color space is RGB Rec.709 or Rec.2020, then the image data may be converted to the YUV color space in order to directly apply SAO to the luma and/or chrominance components of the image data. Once the image data is converted to the YUV color space, one or more offsets based on SAO may be applied to the converted image data in the YUV color space. An inverse transform or color conversion algorithm may be applied to the data in the YUV color space to return to the original RGB color space.

The determination, type of color space and/or sampling format conversion may be signaled or identified within a set of encoded data and, in some instances, may be included in a sequence parameter set (SPS), picture parameter set (PPS), slice header, or the SAO syntax. In other instances this information may be part of other metadata or may be signaled elsewhere.

An inverse transform for returning to the native color space may be derived by computing an inverse of a forward transform M. For example, inverse transform $M^{-1}$ may be computed as $M^{-1}=adj(M)/det(M)$, where adj is the adjucate of matrix M, and det is the determinant of M. In some instances, such a computation may reduce the overhead needed for signaling a return to the native color space.

Applying SAO in non-native color spaces may, in some instances, replace the existing native color space methods in HEVC or future video coding systems. In other instances, the ability to apply SAO in non-native color spaces may be added as an additional option in HEVC or other video coding systems. In some instances, the conversion to different color spaces may be restricted to only 4:4:4 content to simplify the computational requirements for conversion, but in other instances the conversion could also be extended to other color sampling cases by allowing the chroma samples to be upscaled and downscaled within the color transformation process as well. Upscaling and downscaling may be performed with simple calculations such as pixel replication or decimation, or may include more computationally intensive filters, starting from bilinear, to multi-tap, edge adaptive, and bi-lateral algorithms among others.

As in the current HEVC specification, it may be desirable to apply one form of SAO for one color sample (e.g. luma), but another form of SAO for different color samples (chroma u or chroma v). Each of the embodiments described herein may support applying different types of SAO non-uniformly and/or on a sample-by-sample basis to video data.

Figure 4:
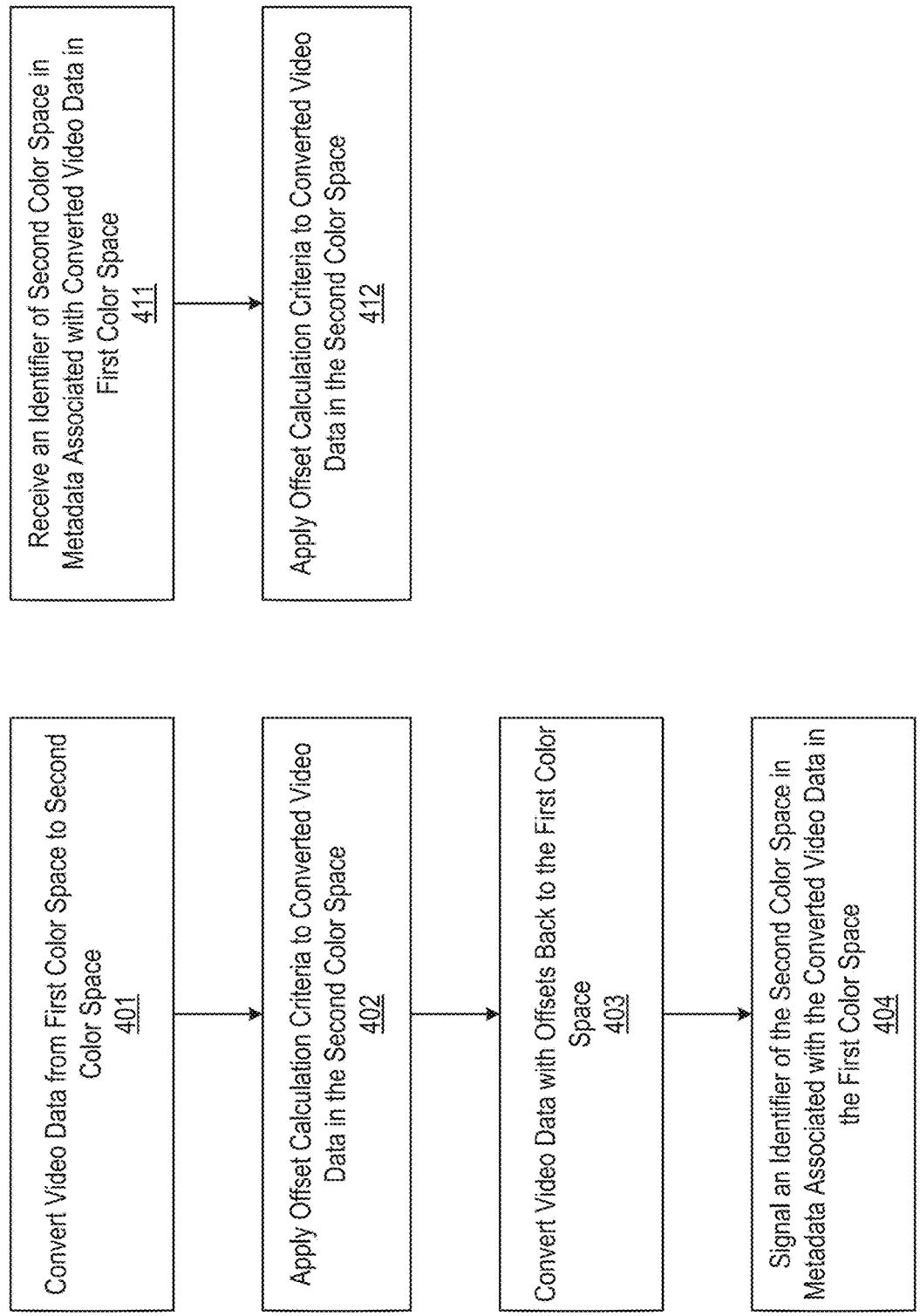
FIGS. 4A and 4B are flowcharts illustrating methods for applying sample adaptive offset in converted color spaces according to an embodiment of the present invention.

FIG. 4A shows an exemplary coding method 400. In box 401, video data may be converted from a first color space to a second color space. The first color space may be a default or predetermined color space in which the video data is to be encoded. The second color space may be selected because it includes one or more color components that may be further improved with an offset applied in the second color space instead of the first color space.

Once the video data has been converted to the second color space, in box 402, at least one offset calculation criterion may be applied to the converted video data in the second color space. Once an offset has been calculated, the converted video data including the calculated offsets may be converted back to the first color space in box 403.

An identifier or other property of the second color space may then be included or otherwise signaled in metadata associated with the converted video in the first color space 404 to provide information about the conversion to the second color space for subsequent video processing functions.

FIG. 4B shows an exemplary decoding method 410. In box 411, an identifier or other property of the second color space may then be received and/or extracted from metadata associated with the converted video in a first color space. The identifier may provide information about conversion to a second color space for video processing functions. Based on the identifier received in box 412, one or more of an offset calculation criterion may be applied to the converted video data in the second color space.

Offset Interpolation

As discussed previously, the existing band offset mode provided an ability to specify an offset for 4 contiguous bands out of 32 possible bands. In some instances, however, it may be desirable to specify offsets for more bands than just the limited set of 4 contiguous bands without necessarily increasing the overhead and/or number of signaled offsets.

To achieve this, in some instances offset signaling may be permitted for non-contiguous bands. In some instances, the same set of 4 bands may be selected, but some or all of the bands may be selected to be nonadjacent. An offset for those intermediate bands situated between nonadjacent bands may be interpolated using the offsets associated with the nonadjacent bands. The number of intermediate bands may be specified in a signaled parameter included within the SPS, PPS, slice header, SAO syntax, or other metadata associated with the encoded data.

In those instances where all of the 4 bands are evenly spaced so that a same number of intermediate bands (parameter sao_intermediate offset) is situated between each of the 4 bands, the number of possible offsets may equal (4+3*sao_intermediate_offsets). If sao_intermediate_offsets is set to a value other than 0, then only the offsets of bands having a band separation distance equal to the parameter sao_intermediate_offsets may be signaled, starting from an initial band at a first band position (parameter sao_band_position), as signaled in the bit stream. Each of the other non-signaled intermediate bands may be interpolated using the signaled band offsets. The simplest method is to use bilinear interpolation and generate the offsets as:

```
w = sao_intermediate_offsets + 1;
s = sao_band_position;
for (k=0;k<4;k++){
  for (i = 1; i < w; i++) {
    band_offset[s +4*k+i] =
      ((w - i) * band_offset[s +4*k] + i * band_offset[s +4*(k+1)] +
      (w>>1)) / w;
  }
}
```

Other, longer filters may be used in different instances. Additional offsets outside this specified range may also be extrapolated based on the values of offsets within the specified range.

Figure 5:
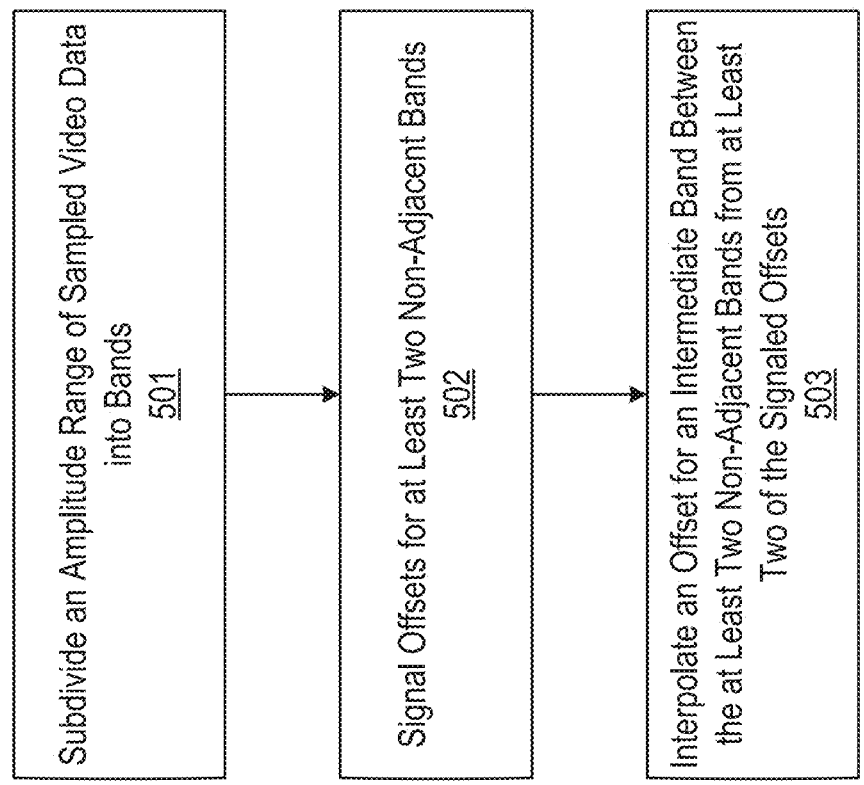
FIG. 5 is a flowchart illustrating a method for offset interpolation according to an embodiment of the present invention.

FIG. 5 shows an exemplary method 500 in an embodiment. In box 501, a range of possible amplitudes of values associated with sampled video data may be subdivided into multiple bands. Each band may correspond to a particular subset of the entire amplitude range such that each amplitude value in the entire range falls in one and only one band.

Due to overhead restrictions, in existing systems it was only possible to specify offset values for a limited contiguous number of these bands, such as only a set of 4 adjacent bands out of 32 bands. In an embodiment, an offset could only be applied to this limited set of contiguous bands for which an offset was expressly specified. In an alternative embodiment, an offset could also not be specified for or applied to bands that were not adjacent to another band for which an offset was specified.

In box 502, offsets may be signaled for each of at least two non-adjacent bands. Thus, instead of requiring offsets to be signaled for a set of 4 contiguous bands adjacent to one another, such as, for example, bands 1, 2, 3, and 4, offsets may be signaled in box 502 for a same number or different number of non-adjacent bands, such as, for example, bands 1, 5, 9, and 13.

In box 503, an offset may be interpolated for an intermediate band between the at least two non-adjacent bands for which an offset was signaled in box 502. The offset may be interpolated using the values of the offsets for the at least two non-adjacent bands signaled in box 502. Any type of interpolation algorithm may be used including, but not limited, to linear, bilinear, polynomial, and spline interpolation.

Non-Uniform Bands

In other instances, samples may be non-uniformly distributed or have different ranges in which smaller changes may be more perceptible to the naked eye, as specified for example by the Weber-Fechner law. In these instances, the sample range need not be split uniformly with evenly spaced bands. Instead, bands may be split using a logarithmic, exponential, or other non-linear function. For example, in some instances, the bands may be defined by the following functions:

$f(x) = \text{ceil}(\log 2(x+1))$, $f(x) = \text{ceil}(\log 2((1<<\text{bitDepth})-x))$ $f(x) = (x<=(1<<(\text{bitDepth}-1))?\text{ceil}(\log 2(x+1)):\text{ceil}(\log 2((1<<\text{bitDepth})-x))$ $f(x) = \text{round}((2.0\char`\^(\text{float}(x)/\text{float}((1<<\text{bitdepth})-1)) *31))-31$ $f(x) = \text{round}((2.0\char`\^(\text{float}((1<<\text{bitDepth})-x-1)/\text{float} ((1<<\text{bitdepth})-1))*31))-31$ These and other functions may be used to create different bands with different numbers of samples within each band. In another embodiment, parameters may be provided in which both the number of bands is explicitly signaled, as well as the number of samples associated with each respective band in a sequence. In some instances, a starting point of each band may be signaled explicitly or differentially via an additional starting point parameter. In other instances those methods provided in existing HEVC specifications may also be used to identify signaled bands.

Interpolation may be used to identify additional offsets beyond those expressly signaled. Intermediate band offsets may be interpolated independent of their size, or a size parameter may be used to scale an interpolated result. In some instances a first band or a particular band creation process may be signaled through a parameter included in the SPS, PPS, slice level, or other metadata associated with the encoded data.

Bands may also be dynamically adjusted for each offset or encoded macroblock, coding unit, or coding tree unit. This may, however, require additional bandwidth and computing power to generate more complex bands. In some instances, instead of switching a band partitioning process for each macroblock, coding unit, or coding tree unit, different supported modes may signaled, including different variations of the band offset and/or edge offset mode. Additionally parameters such as the sao_type_idx_luma and sao_type_idx_chroma indicators may also be provided to further increase the number of supported modes.

Figure 6:
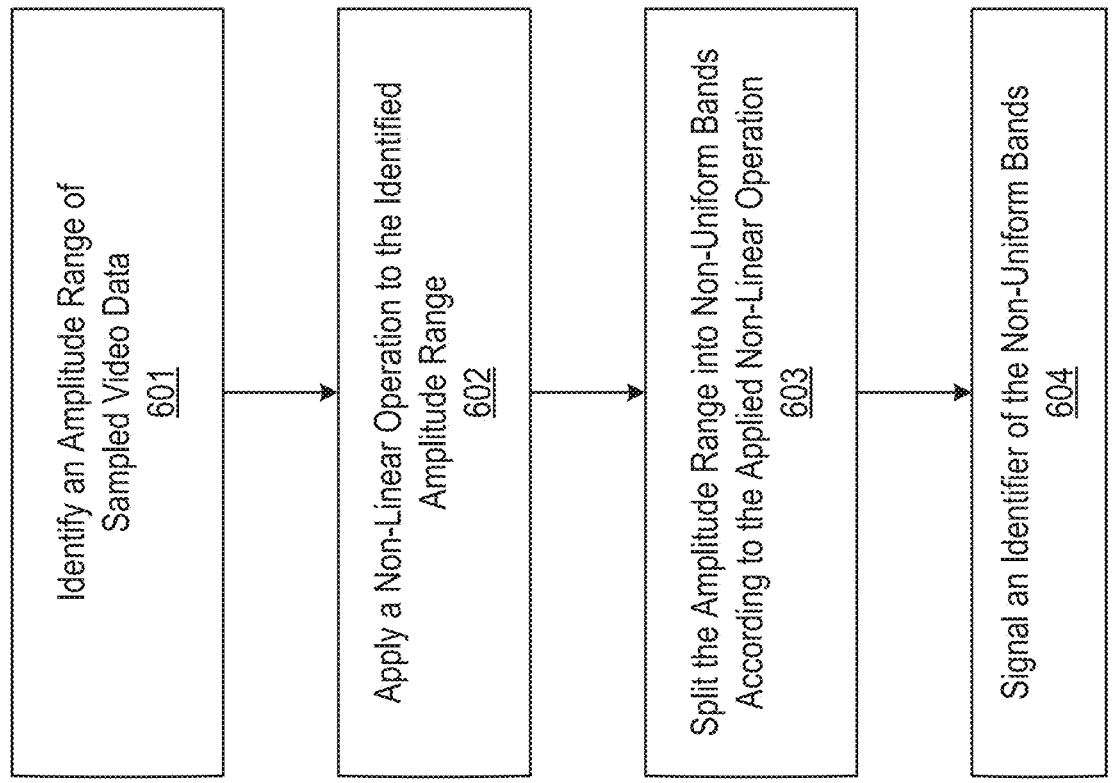
FIG. 6 is a flowchart illustrating a method for identifying offsets for samples having non-uniformly distributed ranges according to an embodiment of the present invention.

FIG. 6 shows an exemplary method in an embodiment. In box 601, a range of possible amplitude values of sampled video data may be identified. In box 602, a non-linear operation may be applied to the identified range. The non-linear operation may subdivide the range of amplitude values into non-uniform bands, with some bands being wider and encompassing more values than other bands. The non-linear operation may include any type of logic or function generating a non-uniform output from which non-uniform bands may be generated. The non-linear operation may include, but is not limited to, a non-linear function such as an exponential, logarithmic, or an at least second order polynomial function. In box 603, the amplitude range identified in box 601 may be split into non-uniform bands based on a result of applying the non-linear operation to the amplitude range. In box 604, an identifier of the non-uniform bands may be signaled or otherwise included in metadata associated with the encoded video data so that the bands may be distinguished. In some instances the identifier may specify a start and/or an end of each band. In other instances the identifier may identify a start of a first band and a formula or other criteria used to identify each of the bands. In other instances, the identifier may include other types of identification information from which the different non-uniform bands may be submitted.

Focused Edge Offset Mode

As discussed herein, in the existing edge offset mode the value of a predetermined sample is compared to two of eight neighboring samples in a horizontal, vertical, or diagonal direction to classify the sample. The existing edge offset mode considers all samples equally without considering the relative magnitude of each of the samples. In some instances, encoders may consider sample magnitudes in addition to the edge characteristics, which may improve a focus on particular edges, objects, or areas that would benefit the most from edge offsetting.

The focus on particular edges, objects, or areas may be achieved by providing for the signaling of an SAO band indicator parameter, such as sao_band_position parameter provided in the band offset mode to indicate the start of the SAO offset bands. This band indicator parameter may specify those band(s) for which the edge offset mode should be applied. In other words, a sample may first be checked to determine if it belongs in a particular band. The edge index EdgeIdx criterion may then be applied to determine the appropriate offsets only if the sample is first determined to belong to the particular band.

In some instances, a single band may be identified as the particular band based on either the uniform sampling scheme as specified in the current HEVC specification or on other non-uniform schemes such as those described herein. In other instances, additional bands, including two or more consecutive bands may also be identified as the particular bands through another parameter specifying an additional number of bands to be processed. Each of the parameters may be signaled in metadata associated with the encoded video data, including but not limited to the SPS, PPS, slice header, or within the SAO syntax. This enhanced edge offset mode may replace the existing edge offset mode or may be provided as an additional type of operating mode.

System Overview

Additionally, while HEVC applies SAO as an in-loop processing mechanism, one or more of the embodiments described herein may be applied as part of the in-loop SAO processing mechanism or they may be applied as post-processing mechanisms independent of a codec such as HEVC. For those embodiments that are applied as codec-independent post-processing mechanisms, SAO metadata could still be signaled within the codec using a carrier mechanism, including but not limited to Supplemental Enhancement Information (SEI) messages, MPEG-2 systems' User Specified Metadata, or other mechanisms. Additionally, embodiments of the invention may be included in other codecs that may provide for some form of SAO. These other codecs may include future codecs or extensions of HEVC, such as the scalable or 3D/multiview extensions of HEVC.

Figure 7:
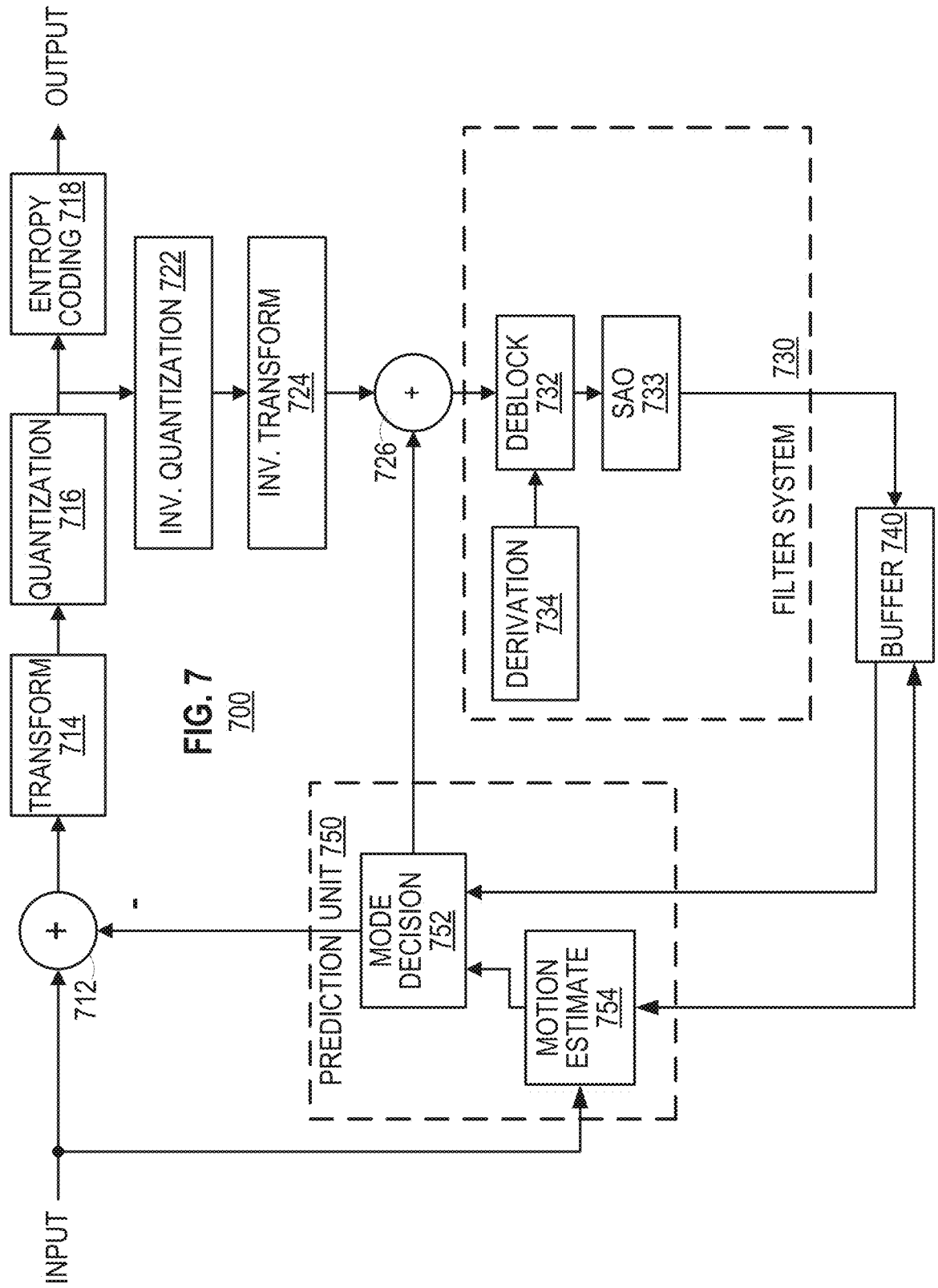
FIG. 7 is a block diagram of a coding system according to an embodiment of the present invention.

FIG. 7 shows a simplified block diagram of a coding system 700 in an embodiment of the invention that includes components for encoding and decoding video data. The system 700 may include a subtractor 712, a transform unit 714, a quantizer 716 and an entropy coding unit 718. The subtractor 712 may receive an input motion compensation block from a source image and, depending on a prediction mode used, a predicted motion compensation block from a prediction unit 750. The subtractor 712 may subtract the predicted block from the input block and generate a block of pixel residuals. If no prediction is performed, the subtractor 712 simply may output the input block without modification. The transform unit 714 may convert the block it receives to an array of transform coefficients according to a spatial transform, typically a discrete cosine transform ("DCT") or a wavelet transform. The quantizer 716 may truncate transform coefficients of each block according to a quantization parameter ("QP"). The QP values used for truncation may be transmitted to a decoder in a channel. The entropy coding unit 718 may code the quantized coefficients according to an entropy coding algorithm, for example, a variable length coding algorithm or context-adaptive binary arithmetic coding. Additional metadata containing the message, flag, and/or other information discussed above may be added to or included in the coded data, which may be output by the system 700.

The system 700 also may include an inverse quantization unit 722, an inverse transform unit 724, an adder 726, a filter system 730, a buffer 740, and a prediction unit 750. The inverse quantization unit 722 may quantize coded video data according to the QP used by the quantizer 716. The inverse transform unit 724 may transform re-quantized coefficients to the pixel domain. The adder 726 may add pixel residuals output from the inverse transform unit 724 with predicted motion data from the prediction unit 750. The summed output from the adder 726 may output to the filtering system 730.

The filtering system 730 may include a deblocking filter 732, a strength derivation unit 734, and a sample adaptive offset (SAO) filter 733. The filters in the filtering system may be applied to reconstructed samples before they are written into a decoded picture buffer 740 in a decoder loop. The deblocking filter 732 may apply deblocking filtering to recover video data output from the adder 526 at a strength provided by the strength derivation unit 734. The strength derivation unit 734 may derive a strength value using any of the techniques described above. The SAO filter 733 may be configured to perform at least one of the offset features described herein, and in some instances may perform different combinations of two or more of the offset features described herein. SAO filtering may be applied adaptively to all samples satisfying particular conditions defined herein. SAO may modify decoded samples by conditionally adding an offset value to each sample based on values in look-up tables transmitted by an encoder. For example, a classifier index specifying classification of each sample and offsets of the samples may be encoded by entropy coder 718 in a bitstream. In a decoding processor, the classifier index and offsets may be decoded by a corresponding decoder. The filtering system 730 also may include other types of filters, but these are not illustrated in FIG. 7 merely to simplify presentation of the present embodiments of the invention.

The buffer 740 may store recovered frame data as outputted by the filtering system 730. The recovered frame data may be stored for use as reference frames during coding of later-received blocks.

The prediction unit 750 may include a mode decision unit 752, and a motion estimator 754. The motion estimator 754 may estimate image motion between a source image being coded and reference frame(s) stored in the buffer 740. The mode decision unit 752 may assign a prediction mode to code the input block and select a block from the buffer 740 to serve as a prediction reference for the input block. For example, it may select a prediction mode to be used (for example, uni-predictive P-coding or bi-predictive B-coding), and generate motion vectors for use in such predictive coding. In this regard, prediction unit 750 may retrieve buffered block data of selected reference frames from the buffer 740.

Figure 8:
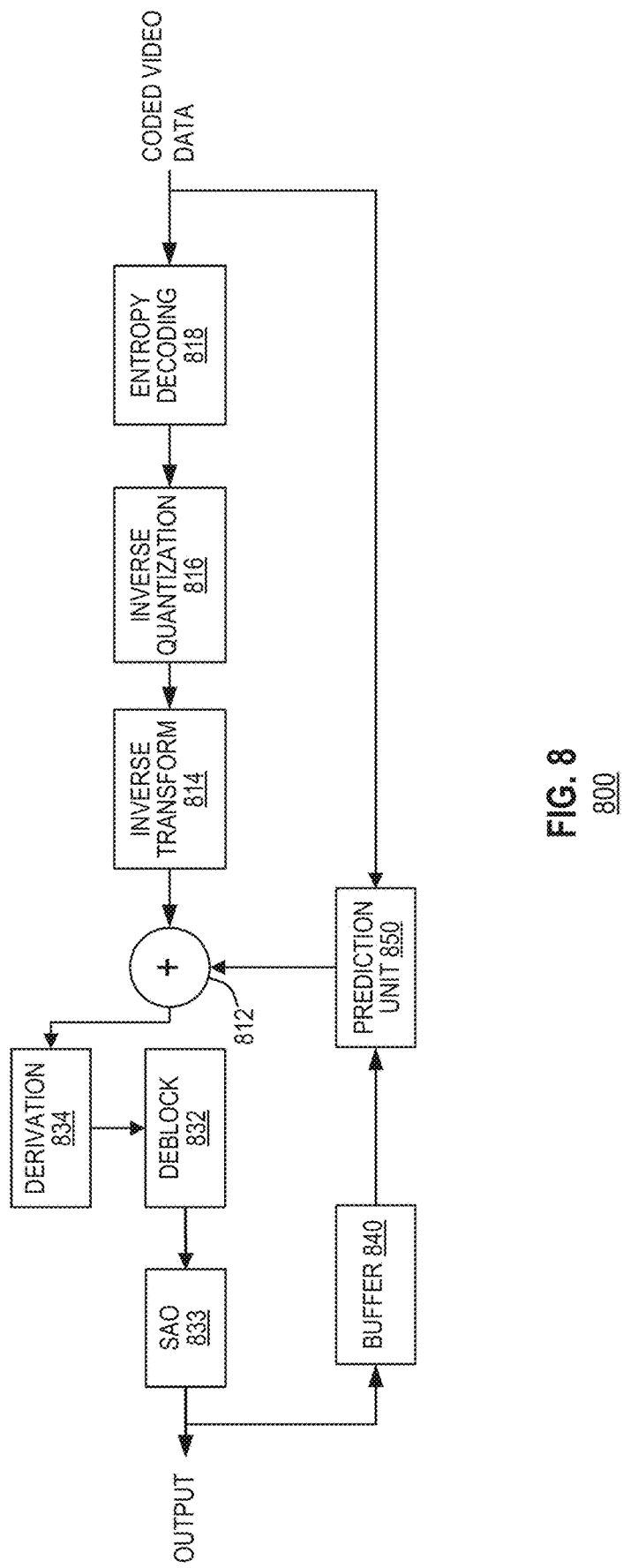
FIG. 8 is a block diagram of a decoding system according to an embodiment of the present invention.

FIG. 8 is a simplified block diagram of a decoder 800 according to an embodiment of the present invention. The decoder 800 may include an entropy decoder 818, an inverse quantizer 816, an inverse transform unit 814, an adder 812, a strength derivation unit 834, a deblocking filter 832, and an SAO filter 833. The decoder 800 further may include a prediction unit 850 and a buffer 840.

The entropy decoder 818 may decode data received from a channel (or via a channel buffer, which is not shown), according to an entropy decoding algorithm, for example a variable length decoding algorithm or context-adaptive binary arithmetic decoding. The inverse quantizer 816 may multiply coefficient data received from the entropy decoder 818 by a quantization parameter. The inverse transform unit 814 may transform dequantized coefficient data received from the inverse quantizer 816 to pixel data. The inverse transform unit 814 may perform the converse of transform operations performed by the transform unit of an encoder (e.g., DCT or wavelet transforms). The adder 812 may add, on a pixel-by-pixel basis, pixel data obtained by the inverse transform unit 814 with predicted pixel data obtained from the prediction unit 850. The adder 812 may output recovered data, from which a recovered frame may be constructed and rendered at a display device (not shown). A frame buffer 840 may accumulate decoded data and build reconstructed frames therefrom. The strength derivation unit 834 may derive a strength value using any of the techniques discussed above. The deblocking filter 832 may perform deblocking filtering operations on recovered frame data according to filtering parameters identified by the channel and at a strength provided by the strength derivation unit 834. The SAO filter 833 may be configured to perform at least one of the offset features described herein, and in some instances may perform different combination of two or more of the offset features described herein. SAO filtering may be applied adaptively to all samples satisfying particular conditions defined herein. SAO may modify decoded samples by conditionally adding an offset value to each sample based on values in look-up tables transmitted by an encoder. For example, a classifier index specifying classification of each sample and offsets of the samples may be read and decoded from a bitstream.

FIG. 9 illustrates a multi-terminal system 900 suitable for use with embodiments of the present invention. The system 900 may include at least two terminals 910, 920 interconnected via a channel 950. For unidirectional transmission of data, a first terminal 910 may code video data at a local location for transmission to the other terminal 920 via the channel 950. The second terminal 920 may receive the coded video data of the other terminal from the channel 950, decode the coded data and display the recovered video data. Unidirectional data transmission is common in media streaming applications and the like.

FIG. 9 also illustrates a second pair of terminals 930, 940 provided to support bidirectional transmission of coded video that may occur, for example, during videoconferencing. For bidirectional transmission of data, each terminal 930, 940 may code video data captured at a local location for transmission to the other terminal via the channel 950. Each terminal 930, 940 also may receive the coded video data transmitted by the other terminal, may decode the coded data, and may display the recovered video data at a local display device.

In FIG. 9, the terminals 910-940 are illustrated as servers, personal computers and smart phones, but the principles of the present invention are not so limited. Embodiments of the present invention find application with laptop computers, tablet computers, media players and/or dedicated video conferencing equipment. Each terminal 910-940 may include a processing device and a memory. The processing device may include a device such as a central processing unit, microcontroller, or other integrated circuit that is configured to execute instructions stored in the memory. Memory may include any form of tangible media that is capable of storing instructions, including but not limited to RAM, ROM, hard drives, flash drives, and optical discs. The channel 950 represents any number of networks that convey coded video data among the terminals 910-940, including for example wire line and/or wireless communication networks. A communication network may exchange data in circuit-switched and/or packet-switched channels. Representative networks include telecommunications networks, local area networks, wide area networks and/or the Internet. In another embodiment, the channel 950 may be provided as a storage device, for example, an electrical, optical or magnetic storage device. For the purposes of the present discussion, the architecture and topology of the channel 950 is immaterial to the operation of the present invention.

The foregoing discussion has described operation of the embodiments of the present invention in the context of codecs. Commonly, codecs are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like. These components may be provided as hybrid systems that distribute functionality across dedicated hardware components and programmed general purpose processors as desired.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. Unless described otherwise herein, any of the methods may be practiced in any combination. For example, the methods of signaling and the method of deriving the quantization factor for classification may be practiced in any combination.

What is claimed is:

1. A decoding method, comprising:
   extracting a quantization factor and coded pixel values from a coded video stream for derivation of sample adaptive offset (SAO) offset values for coded luma data and for derivation of SAO offset values for coded chroma data,
   decoding the coded pixel values to produce reconstructed pixel data,
   scaling the reconstructed pixel data by applying the quantization factor to produce scaled pixel values,
   rounding the scaled pixel values;
   evaluating the rounded pixel values,
   classifying a reconstructed pixel at a current location into a category based on the evaluation,
   deriving a first SAO offset value for luma data based on the classification,
   performing SAO filtering on a luma component of the reconstructed pixel data using the derived first SAO offset value as an input identifying an offset in the SAO filtering operation, deriving a second SAO offset value for chroma data based on the classification, and performing SAO filtering on a chroma component of the reconstructed pixel data using the derived second SAO offset value as an input identifying an offset in the SAO filtering operation.

2. The method of claim 1, wherein the function applied to scaled pixel data is a rounding function.

3. The method of claim 1, wherein the function applied to scaled pixel data is a floor or ceiling calculation function.

4. The method of claim 1, wherein rounding scaled pixel values rounds to whole number pixel values.

5. A decoding method, comprising:

extracting a quantization factor and coded pixel values from a coded video stream for derivation of sample adaptive offset (SAO) offset values for coded luma data, decoding the coded pixel values to produce reconstructed pixel data, scaling the reconstructed pixel data by applying the quantization factor to produce scaled pixel values, rounding the scaled pixel values;

evaluating the rounded pixel values, classifying a reconstructed pixel at a current location into a category based on the evaluation, deriving an SAO offset value based on the classification, and performing SAO filtering on a luma component of the reconstructed pixel data sing the derived SAO offset value as an input identifying an offset in the SAO filtering operation.

* * * * *